US009321938B2

(12) United States Patent
Ko et al.

(10) Patent No.: US 9,321,938 B2
(45) Date of Patent: Apr. 26, 2016

(54) DUAL CROSSLINKED TACKIFIED PRESSURE SENSITIVE ADHESIVE

(75) Inventors: Chan U. Ko, Arcadia, CA (US); Dominique Wouters, Gierle (BE); Graham Yeadon, Marbach (CH); Prakash Mallya, Sierre Madre, CA (US); Roger Maerki, Scherzingen (CH)

(73) Assignee: Avery Dennison Corporation, Glendale, CA (US)

( * ) Notice: Subject to any disclaimer, the term of this patent is extended or adjusted under 35 U.S.C. 154(b) by 310 days.

(21) Appl. No.: 13/394,883

(22) PCT Filed: Sep. 13, 2010

(86) PCT No.: PCT/US2010/048598
§ 371 (c)(1),
(2), (4) Date: Mar. 8, 2012

(87) PCT Pub. No.: WO2011/032074
PCT Pub. Date: Mar. 17, 2011

(65) Prior Publication Data
US 2012/0171484 A1    Jul. 5, 2012

Related U.S. Application Data

(60) Provisional application No. 61/241,553, filed on Sep. 11, 2009.

(51) Int. Cl.
*C09J 133/02* (2006.01)
*C09J 7/02* (2006.01)
*C08K 5/3412* (2006.01)
*C09J 133/06* (2006.01)

(52) U.S. Cl.
CPC ............. *C09J 7/0217* (2013.01); *C08K 5/3412* (2013.01); *C09J 133/02* (2013.01); *C09J 133/068* (2013.01); *C09J 2205/102* (2013.01); *Y10T 428/287* (2015.01)

(58) Field of Classification Search
None
See application file for complete search history.

(56) References Cited

U.S. PATENT DOCUMENTS

| 4,418,120 A | 11/1983 | Kealy et al. |
| 4,456,741 A | 6/1984 | Ames |
| 4,726,982 A | 2/1988 | Traynor et al. |
| 4,726,983 A | 2/1988 | Harada et al. |
| 5,639,811 A * | 6/1997 | Plamthottam et al. ........ 524/272 |
| 5,723,191 A | 3/1998 | Plamthottam et al. |
| 5,874,143 A | 2/1999 | Everaerts |
| 6,893,718 B2 * | 5/2005 | Melancon et al. ...... 428/355 AC |
| 7,109,266 B2 | 9/2006 | Ishiguro et al. |
| 2001/0012551 A1 * | 8/2001 | Peloquin et al. ............. 428/41.5 |
| 2005/0016435 A1 | 1/2005 | Burns |
| 2005/0196608 A1 * | 9/2005 | Wouters et al. ........... 428/355 R |

FOREIGN PATENT DOCUMENTS

| CN | 1212007 | 3/1999 |
| DE | 323122 | 7/1920 |
| EP | 0303430 | 2/1989 |
| JP | 59018774 | 1/1984 |
| JP | 60069180 | 4/1985 |
| JP | 05-132657 | 5/1993 |
| JP | 07-138544 | 5/1995 |
| JP | 2003-238910 | 8/2003 |
| WO | 97/31076 | 8/1997 |
| WO | 2008/091050 | 7/2008 |
| WO | 2008/116033 | 9/2008 |

OTHER PUBLICATIONS

Satas Handbook of Pressure Sensitive Adhesive Technology, Von Nostrand Reinhold Company, Ch. 20, p. 527-584 (1989).
International Search Report dated Oct. 13, 2010 for International Application No. PCT/US2010/048598 filed Sep. 13, 2010.
Written Opinion dated Oct. 13, 2010 for International Application No. PCT/US2010/048598 filed Sep. 13, 2010.

* cited by examiner

*Primary Examiner* — Satya Sastri
(74) *Attorney, Agent, or Firm* — Avery Dennison Corporation

(57) ABSTRACT

Tackfied PSAs and tapes comprising a copolymer based on an acrylic backbone, with a glycidyl monomer, unsaturated carboxylic acid monomer and a tackifier, said adhesives being dual curable and having combination of outstanding peel adhesion on the LSE substrates, high temperature shear performance, excellent stress relieving properties and excellent converting properties.

14 Claims, No Drawings

DUAL CROSSLINKED TACKIFIED PRESSURE SENSITIVE ADHESIVE

CROSS-REFERENCE TO RELATED APPLICATION

The present application is a 371 of International Application No. PCT/US2010/045898, which was published in English on Mar. 17, 2011, which claims priority to U.S. Provisional Application No. 61/241,553 filed Sep. 11, 2009 which is incorporated herein by reference in it.

FIELD OF THE INVENTION

This invention relates to pressure-sensitive adhesives and more particularly to tackified acrylic based pressure sensitive adhesives which are in-line mixed with aziridine crosslinker after the tackification and which are dual cured.

BACKGROUND OF THE INVENTION

The automotive, consumer appliance, consumer electronics, and other industries require adhesives that have a combination of properties such as long durability, resistance to continuous exposure to high temperatures, and good peel adhesion to a wide range of substrates such as metals, plastics, paints and the like. While rubber/resin based adhesives show excellent peel adhesion to many substrates, they perform poorly at elevated temperatures. Acrylic based adhesives, in contrast, either have outstanding peel adhesion and poor elevated temperature performance or low peel adhesion and outstanding elevated temperature performance. What is desired is a durable adhesive with good peel adhesion to low surface energy (LSE) substrates, high shear adhesion failure temperature, good stress relieving properties, and excellent converting properties.

It is known that peel adhesion to various substrates is generally improved if acrylic pressure-sensitive adhesives are compounded with low molecular weight tackifying resins. For example, Japanese Patent 8569180 (assigned to Nitto) teaches the use of terpene phenolic resin as a tackifier in photocurable pressure-sensitive adhesives. The use of other types of resins, including rosin resin, is described in the Japanese Journal "Setchaku" (Vol. 23, p. 489-504, 1984). The use of cyclohexene resin is descried in DE 323122 (1983).

U.S. Pat. No. 4,418,120 to Kealy et al., discloses a crosslinked tackified polymer based on isooctylacrylate and 3 to 7% by weight acrylic acid. The polymer is stated to have an inherent viscosity of 0.75 to 1.5 dl/g prior to cure. The cured product was stated to have shear value at 70° C., of at least 5,000 minutes. Incorporating low molecular weight resins into the adhesive formulation typically results in adhesives which have poor high temperature shear adhesion.

The durability, adhesiveness, and other properties of pressure sensitive adhesives are also affected by both the choice of monomers which comprise the copolymer, and the type of curing employed. Japanese patent No. 84-18774 discloses a radiation curable pressure-sensitive composition containing a terpene-phenolic resin and glycidyl methacrylate monomer. The cure is through carbon-carbon double bonds and is activated by radiation.

U.S. Pat. No. 6,893,718B2 to K. Melancon et al., discloses PSA composition containing a bisamide crosslinking agent which provide high temperature resistance and adhesion, but these types of PSAs do not adhere well to low surface energy substrates such as polypropylene substrates. Similarly, U.S. Pat. No. 4,456,741 to Ames discloses a hot melt acrylic adhesive containing tackifiers having good peel adhesion and permanent tack, but low shear adhesion.

U.S. Pat. No. 4,726,982 to Traynor et al., discloses a tackified acrylic based pressure sensitive composition containing N-vinyl-2-pyrrolidone, and described as being useful in adhering to high solids automotive paints.

U.S. Pat. No. 7,109,266 to Isiguro et al., discloses acrylic pressure sensitive adhesive composition containing an acrylic polymer and a tackifier obtained by acid modification of a tackifier resin inherently free of an acid component which makes PSA composition having high initial adhesive strength.

U.S. Pat. No. 5,639,811 to Plamthottam et al., teaches tackified pressure sensitive adhesives and tapes comprising a copolymer based on an acrylic backbone, with a glycidyl monomer, unsaturated carboxylic acid monomer and preferably a vinyl lactam monomer, and a tackifier, said adhesives being dual curable and exhibiting outstanding peel adhesion and high temperature shear performance. However, molecular weight was not sufficiently high to pass the extremely high temperature shear requirements.

WO 2008/116033 teaches pressure sensitive adhesive formed from a blend comprising: a) an acrylate polymer having a Tg less than 20° C. and a molecular weight greater than 20,000, b) an oligomer having at least one crosslinkable functional group, wherein the oligomer is liquid at room temperature, and c) at least one crosslinking agent, wherein at least one of a) and b) is crosslinked in the presence of the other.

US patent 2005/0061435 A1 to Everaerts et al., discloses latent over-tackified adhesive that can be activated with a plasticizer upon demand to form a pressure sensitive adhesive. This formulation utilizes aziridine crosslinker but does not enhance the high temperature shear during the product use.

U.S. Pat. No. 5,874,143 to Peloquin et al., discloses incorporation of a plasticizer material into a tackified acrylic PSA. The resulting PSA is shown to provide improved bonding of the marking films and labels to low energy surfaces such as high density polyethylene plastic.

Despite all the attempts, a PSA having combination of high peel adhesion to low surface energy substrates, high temperature shear, excellent stress relieving properties, and excellent converting properties is not available. For many industrial tape bonding applications with new materials, the PSA are still required to have a combination of properties such as high cohesive strengths, adhesion to low surface energy substrates, and stress relieving properties.

SUMMARY OF THE INVENTION

The present invention provides a high molecular weight acrylic based pressure sensitive adhesive in which pendant epoxy functionality and pendant carboxylic acid functionality are incorporated into an acrylic based copolymer which, when combined with a tackifier along with in-line mixed aziridine crosslinker, provides a dual cure adhesive having high cohesive strengths, good adhesion to low surface energy substrates, and good stress relieving properties.

The acrylic copolymer is based on a backbone of polymerized alkyl acrylate ester and/or alkyl methacrylate ester monomers, and further comprises polymerized glycidyl monomers which contain the desired epoxy functionalities, and a positive amount of an unsaturated carboxylic acid. The copolymer is combined with a tackifier along with in-line mixed aziridine crosslinker to yield a "dual curable" tackified pressure sensitive adhesive. When the adhesive is initially (or primarily) cured by exposure to heat, the result is an adhesive exhibiting excellent tack and peel and good balance of high temperature shear. When the adhesive is subsequently exposed to elevated temperatures under use conditions (a secondary cure), an intrinsic interaction occurs between adjacent copolymer chains. Without being bound by any particular theory, the epoxy moieties of the glycidyl monomers appear to interact with carboxylic acid moieties, thereby effectuating an intrinsic secondary cure that further crosslinks the copolymer.

The adhesives of the present invention may further comprise other conventional adjuvants such as fillers pigments, diluents, and the like. The present invention also provides for use of the adhesives of the invention in, for example, transfer tapes and single or double-coated tapes comprised of core and at least one skin layer of the adhesives of the instant invention. The adhesives and tapes of the present invention show good adherence to a variety of substrates, and can be used for structural bonding and other applications.

DETAILED DESCRIPTION OF THE INVENTION

Pressure-sensitive adhesives of the present invention are prepared by combining certain high molecular weight acrylic based copolymers ("the copolymer") with a tackifier along with in-line mixed aziridine and initially curing the combination by exposure to heat. This is known herein as primary (or initial) cure.

The copolymer is prepared by copolymerizing a mixture of monomers comprising at least one monomer selected from the group consisting of alkyl acrylate esters and mixtures thereof a glycidyl monomer selected from the group consisting of allyl glycidyl ethers, glycidyl acrylate esters, glycidyl methacrylate esters, and mixtures thereof, and an unsaturated carboxylic acid.

If limited to an amount that does not result in a copolymer with a glass transition temperature lower than about −15° C., alkyl acrylate or methacrylate esters containing less than four carbon atoms in the alkyl group may be incorporated into the copolymer.

On a copolymerized basis, the copolymers of the present invention typically comprise from about 55 to about 85% by weight of an alkyl acrylate or alkyl methacrylate ester containing 4 to about 12 carbon atoms in the alkyl group; from 0 to about 35% by weight of an alkyl acrylate or alkyl methacrylate ester containing 1 to about 4 carbon atoms in the alkyl group, from about 0.01 to about 2% by weight of a glycidyl monomer; and a positive amount up to about 15%, preferably from about 5% to about 13% by weight of an unsaturated carboxylic acid.

In one embodiment, the ratio of the monomers is selected to give a polymer whose glass transition temperature is less than about −15° C. The uncured copolymers of the present invention have a weight average molecular weight of at least about 200,000, preferably from about 200,000 to about 1,000,000, as determined by size exclusion chromatography calibrated using polystyrene.

Examples of alkyl acrylates or methacrylates containing 4 to about 12 carbon atoms in the alkyl group include without limitation 2-ethyl hexyl acrylate, isooctyl acrylate, butyl acrylate, sec-butyl acrylate, methyl butyl acrylate, 4-methyl-2-pentyl acrylate, isodecyl methacrylate, methyl acrylate, ethyl acrylate, methylmethacrylate and the like, and mixtures thereof.

Examples of unsaturated carboxylic acids which are useful in the present invention include without limitation acrylic, methacrylic, fumaric acid, and the like along with mixtures thereof.

As described below, the copolymer may also comprise from 0 to about 30% by weight, preferably, from about 0.01 to about 1% by weight, of an activator moiety monomer whose presence in the copolymer lowers the temperature at which the adhesive undergoes an intrinsic elevated temperature secondary cure typically under use conditions.

The copolymers may be synthesized using solution, emulsion, and batch polymerization techniques. According to one embodiment of the invention, the copolymers are prepared in solution using a mixture of solvents. Solution polymerization involves the use of blends of ethyl acetate and acetone. The ratio of solvents is adjusted to provide a reflux temperature of from about 68° C. to about 78° C. Solids content during polymerization may typically range from about 40% to about 60% in order to achieve the desired weight average molecular weight, and yet achieve viscosities that are manageable in the reactor. Reaction occurs in the presence of free-radical initiators, preferably of the azo type, for example, 2,2'-azo-bis-isobutyronitrile. Further the reactor may be inserted with a nitrogen purge which leads to polymers having molecular weights which are typically above 500,000.

Tackifiers

Once the copolymer has been prepared, a pressure-sensitive adhesive is formulated by combining the copolymer with a tackifier. A wide variety of tackifiers can be used to enhance the tack and peel of the adhesive. Such tackifiers include, but are not limited to, rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

A wide range of such tackifiers are commercially available including, but not limited to, Foral® 85 (glycerol ester of a highly stabilized rosin), Foral® 105 (pentaerythritol ester of a hydrogenated rosin), Stabilite ester 10, and Pentalyn® H, manufactured and sold by Hercules, Inc., PE Estergum and the like, manufactured by Arizona Chemical Co., and Sylvatac® 40N, Sylvatac® RX, Sylvatac® 95 and the like, manufactured by Sylvachem Corporation.

There may also be employed as tackifiers terpene resins which are hydrocarbons of the formula $C_{10}H_{16}$, occurring in most essential oils and oleoresins of plants, and phenol modified terpene resins like alpha pinene, beta pinene, dipentene, limonene, myrecene, bornylene, camphene, and the like. Various aliphatic hydrocarbon resins like Escorez™ 1304, manufactured by Exxon Chemical Co., and aromatic hydrocarbon resins based on $C_9$'s, $C_5$'s, dicyclopentadiene, coumarone, indene, styrene, substituted styrenes and styrene derivatives and the like can also be used.

Hydrogenated and partially hydrogenated resins such as Regalrez™ 1018, Regalrez™ 1033, Regalrez™ 1078, Regalrez™ 1094, Regalrez™ 1126, Regalrez™ 3102, Regalrez™ 6108, etc., produced by Hercules Corporation, can be used as tackifiers in the present invention as well. Various terpene phenolic resins of the type SP 560, manufactured and sold by Schenectady Chemical Inc., Nirez 1100, manufactured and sold by Reichold Chemical Inc., and Piccolyte® S-100, manufactured and sold by Hercules Corporation, are particularly useful tackifiers for the present invention. Further, various mixed aliphatic and aromatic resins, such as Hercotex AD 1100, manufactured and sold by Hercules Corporation, can also be used as tackifiers.

While the resins described above are quite useful for tackifying the copolymers of the instant invention, the particular tackifying resin and/or amount selected for a given formulation may depend upon the type of acrylic polymer being tackified. Some resins, such as Foral® 85, are broadly compatible with acrylic compositions. Others, like Regalrez™ 6108, tackify a limited number of compositions. The type of tackifying resin along with the amount employed is to be substantially compatible with the acrylic polymer. As used herein, the term "substantially compatible" means that when the tackifier and copolymer are combined, the resulting combination is substantially transparent, as opposed to cloudy, to normal vision. Many resins which are known in the prior art as being useful for tackifying acrylic based pressure sensitive adhesives can be effectively used in the practice of the present invention, although the scope of the invention is not limited to only such resins. Resins described in Satas, Handbook of Pressure Sensitive Adhesive Technology, Von Nostrand Reinhold Company, ch. 20, pages 527-584 (1989) (incorporated by reference herein) could be used. Resins described in U.S. Pat. Nos. 4,418,120 and 4,726,983 (incorporated by reference herein) and EP 0,303,430 (incorporated by reference herein) are particularly useful.

Again, the amount of tackifier used in the present invention is dependent upon the type of copolymer and tackifier used. Typically, pressure sensitive adhesive compositions prepared in accordance with the present invention will comprise from about 5% to about 60% by weight total of one or more tackifiers.

Crosslinkers

The tackified adhesive can be crosslinked using an aziridine crosslinker. Conventional aziridine crosslinkers can be used. In one embodiment, the aziridine crosslinker is CX-100 from DSM NeoResins. The aziridine crosslinker CX-100 is a 100% active polyfunctional aziridine liquid crosslinker. The crosslinker can be added using an in-line mixer process just before coating the mixture onto the web. The range of crosslinker level is from about 0.05 to about 1% by weight based on the weight of the dry adhesive.

Other Additives

The adhesives of the present invention may further comprise one or more conventional adjuvants such as pigments, fillers, plasticizer, diluents, and the like. Pigment, if desired, is provided in an amount sufficient to impart the desired color to the adhesive. Examples of pigments include, without limitation, solid inorganic fillers such as carbon black, titanium dioxide and the like, and organic dyes.

If desired, diluents such as plasticizers may be added in the place of a portion of the tackifier in order to alter the properties of tackiness and cohesive strength.

The pressure sensitive adhesives of the instant invention are primarily cured by exposure to heat, chemical crosslinking agent, actinic radiation, or electron beam radiation. The result is excellent tack and peel and a good balance of high temperature shear. The incorporation of glycidyl acrylate and/or glycidyl methacrylate in the copolymerization appears to aid in the production of the desired high molecular weight polymers.

In one embodiment of the invention, the adhesives are primarily cured by exposure to heat under drying conditions; i.e., the adhesives are cured at elevated temperatures sufficient to evaporate solvent(s) from the composition. Such temperatures typically range from about 70° C. to about 120° C.

A "secondary cure" of the adhesives occurs when the adhesive is subsequently exposed to elevated temperatures, typically under use conditions. While not being bound by theory, it is believed that an intrinsic interaction predominantly occurs between pendant epoxy functionalities of the polymerized glycidyl-containing monomers and pendant carboxylic acid functionalities of the polymerized unsaturated carboxylic acid monomers. It should be understood that "secondary cure" can also occur, at least in part, under the conditions of the primary cure, when the latter is effectuated by exposing the adhesive to heat. Thus some interaction between epoxy and carboxylic acid functionalities can occur during primary cure. This results in enhanced high temperature performance.

Any chemical species which has the effect of lowering the activation temperature of the secondary cure and which is compatible with the tackified acrylic based adhesives of the present invention may be used. Typically, the activation temperature is no greater than about 120° C. By adjusting the amount and type of activator moiety used, it is possible to "dial in" the temperature of secondary cure.

In addition to the adhesive compositions described above, the present invention further provides both a transfer tape and tapes of layered construction, the latter consisting of a core coated on one or both sides with a skin layer comprised of a tackified acrylic based copolymer of the instant invention.

Transfer tapes prepared in accordance with the present invention comprise a self-supporting film of pressure-sensitive adhesive as described above, and at least one release liner. Thus, the pressure-sensitive adhesives may be coated on a release liner, such as a silicone release coated paper, and stored as a roll.

The adhesives and tapes of the present invention exhibit excellent peel adhesion to a variety of substrates such as metals, plastics, and paints.

The following tests were used to determine various physical properties of the present invention:

90° peel was measured in a manner similar to that described in Test Methods for Pressure Sensitive Adhesives, 8th edition, PSTC #1, with the adhesive being laminated onto a 2 mil Mylar film.

High Temperature Shear (232° C.) was measured in a manner similar to that described in Test Methods for Pressure Sensitive Adhesives, 8th edition, PSTC #7 with a dwell time of 24 hours.

Electronic Shear test was conducted as following: an L-shaped stainless steel panel was bonded with a second stainless steel panel with a hole at one end using the pressure sensitive adhesive being studied. A 200 g load was hung to the $2^{nd}$ panel through hole. The L-shaped panel is secured to a substrate so that the laminated part of the two panels are horizontally placed and the weight is vertically placed. The time it took the second panel to fall off the L-shaped panel at 60° C. was measured to characterize the holding power of the adhesive.

Dome Tent Lift test was measured by placing 1"×1" tape with 2 mil thick aluminum backing over a 13 mm diameter hole with 11 mm rivets in the hole. There are 3 holes per plate in a triangle dome tent shape. 1 kg weight was placed in the middle of the holes and the adhesive lift around the base of the hole was measured.

Dynamic shear properties (modules and tandelta) were measured using TA Instruments ARES with 8 mm parallel plates. Time-temperature superposition was conducted with 25° C. as the reference temperature.

While not limiting, the following illustrate the invention.

Example 1

HPA HC

A monomer mixture was made up by mixing 207 g of butyl acrylate, 61.2 g of 2-ethyl hexyl acrylate, 23.1 g of acrylic acid, and 0.1 g of glycidyl methacrylate. 68.5 g of this mixture was introduced to a 1.5 liter nitrogen purged reactor equipped with a pitched turbine agitator, a reflux condenser and a thermistor. Also added were 29.7 g of ethyl acetate and 18 g of acetone. The contents of the reactor were heated to reflux and 0.05 g of Vazo® 64 (2-2'-azo-bis-isobutyronitrile), manufactured and sold by Dupont, in 4.5 g of ethyl acetate was added. Vigorous reflux started in a short time and the contents of the reactor were held for 15 minutes. At this time, the remaining monomers were mixed with 195 g of ethyl acetate, 40 g of acetone and 0.24 g of Vazo® 64 and added as a single feed mixture over 3 hrs. All through the feed, temperature was maintained to keep reactor contents under reflux. One hour after end of feed, 0.12 g of Vazo® 64 was added in 9 g of ethyl acetate and 4 g of acetone, and held for an additional hour. This step was repeated twice more. At the end of the final addition, 1 additional hour was held, and then 178 g of toluene and 27 g of heptane was added. The percentage of solids content at the end was 36% and the viscosity was 8000 Pa·s using #4 spindle at 12 rpm on a Brookfield viscometer. The resulting polymer consisted of 71% by weight butyl acelate, 21% by weight 2-ethyl hexyl acrylate, 8.0% acrylic acid, and 0.03% by weight glycidyl methacrylate. The polymer was formulated with 20 weight % Dertophene T tackifier (a terpine phenolic) made by DRT, France. The tackified adhesive was then mixed in-line with 0.1% CX-100, the aziridine crosslinker from NeoResins, Netherland. A special metering and mixing system, LADO-MIX V-SB, made by DOPAG, Switzerland was used to accurately meter and homogeneously mix the tackified adhesive with the aziridine crosslinker just before coating onto the web yielding Example 1, identified as HPA HC.

The composition was coated on a release film to give a coating thickness of about 60 gsm and the film was dried at 70° C. for 15 minutes.

For comparative purposes, current product FT 2022 was evaluated as shown in Table 1.

TABLE 1

High Temperature performance testing

|  | HPA HC as current invention | FT 2022 as control |
|---|---|---|
| 90° C. Peel 15 min, PP at ambient temperature (N/in) | 15.3 | 8.0 slip-stick |
| 90° C. Peel 15 min, SS at ambient temperature (N/in) | 19.3 | 19.5 |
| High Temp (80° C.) peel, SS (N/in) | 10.2 | 7.0 |
| 232° C., 400 g Shear | 10,000 min | 5 min |
| Dome Tent Lift test (increase in diameter) | 1.0 mm | 3.0 mm |

TABLE 2

The Electronics Shear testing results

| Description | Time for failure at 60° C. 200 g load |
|---|---|
| 3M 300MP | 40 min |
| HPA HC as current invention | 95 min |
| S624 | 2 min |

TABLE 3

Dynamic mechanical properties

| Sample ID | Description | Frequency (rad/s) (rad/s) | tan d (max) | G'/tan d@ 1E+05 rad/s (dyn/cm2) | Predictive adhesive convertibility rank (diecut) |
|---|---|---|---|---|---|
| 300 LSE | 3M 300 LSE | 4514 | 1.86 | 1.24E+08 | 5 |
| HPA HC | Example 1 | 3178 | 1.76 | 2.75E+08 | 6 |

Frequency Means the Frequency for Tan d Maximum.

As indicated in Table 1, the tape formulated in accordance with the present invention exhibited 1) Higher 90° C. peel adhesion on plastics, 2) Higher 80° C. (high temp) peel adhesion, 3) at 232° C. under 400 g load, much higher shear value, and 4) smaller dome tent lifting, indicating better stress relieving properties.

As indicated in Table 2, the tape formulated in accordance with the present invention exhibited the longest time to fail compared to the other two comparative samples at 60° C. under 200 g load.

As indicated in Table 3, the tape formulated in accordance with the present invention exhibited a much higher G'/tan d value at the 100,000 rad/s frequency than the 3M300 LSE, a commercial counterpart. This ratio has been used to predict adhesive die-cuttability wherein the higher the ratio, the better the die-cuttability of the adhesive.

What is claimed is:

1. A tackified pressure sensitive adhesive composition comprising a dual cured acrylic based copolymer comprising aziridine crosslinker;
   wherein the acrylic based copolymer is comprised of a copolymerized mixture of monomers comprising at least one monomer selected from the group consisting of alkyl acrylate esters and mixtures thereof; a glycidyl monomer selected from the group consisting of allyl glycidyl ethers, glycidyl acrylate esters, glycidyl methacrylate esters, and mixtures thereof, and an unsaturated carboxylic acid.

2. The composition of claim 1 further comprising one or more adjuvants selected from fillers, pigments, diluents, and plasticizers.

3. A tackified pressure sensitive adhesive composition comprising a crosslinked acrylic based copolymer comprising, on a copolymerized basis, 90-50% of butyl acrylate, 5-40% of 2-ethyl hexyl acrylate, from 0.01 to 0.1% of a glycidyl methacrylate ester, a positive amount up to about 10% of an unsaturated carboxylic acid monomer, 10 to 40% of a tackifier, and 0.05 to 1% of aziridine crosslinker.

4. A method of making a dual curable pressure sensitive adhesive, said method comprising:
   a) copolymerizing a mixture of monomers comprising at least one monomer selected from the group consisting of alkyl acrylate esters and mixtures thereof; a glycidyl monomer selected from the group consisting of allyl glycidyl ethers, glycidyl acrylate esters, glycidyl methacrylate esters, and mixtures thereof, and an unsaturated carboxylic acid to form a copolymer;
   b) adding a tackifier to make a tackified adhesive; and
   c) adding an aziridine crosslinker to the tackified adhesive to yield a dual curable pressure sensitive adhesive.

5. The method of claim 4 further comprising addition of one or more adjuvants selected from fillers, pigments, diluents, plasticizers and the like, to the dual curable pressure sensitive adhesive.

6. The method of claim 4 further comprising
d) coating the adhesive formulation onto a substrate; and
e) drying the adhesive formulation.

7. An adhesive coated product comprising the pressure sensitive adhesive of claim 1.

8. The product of claim 2 wherein the product is a tape.

9. The tackified pressure sensitive adhesive of claim 1, wherein the dual cure consists of a primary and secondary cure.

10. The tackified pressure sensitive adhesive of claim 9, wherein the primary and secondary cure are by exposure to heat.

11. The tackified pressure sensitive adhesive of claim 10, wherein the primary cure temperature is from 70 C to 120 C.

12. The tackified pressure sensitive adhesive of claim 1, wherein the composition comprises 55-85% by weight of an alkyl acrylate or alkyl methacrylate ester containing 4-12 carbon atoms, 0-35% by weight of an alkyl acrylate or alkyl methacrylate ester containing 1 to about 4 carbon atoms, 0.01 to 2% by weight of the glycidyl monomer and 5-13% of an unsaturated carboxylic acid.

13. The tackified pressure sensitive adhesive of claim 1, wherein the ratio of monomers is selected to give a polymer whose glass transition temperature is less than −15 C.

14. The tackified pressure sensitive adhesive of claim 1, wherein the at least one monomer includes butyl acrylate and ethyl hexyl acrylate, wherein the at least one glycidyl monomer includes glycidyl methacrylate, and the unsaturated carboxylic acid is acrylic acid.

\* \* \* \* \*